United States Patent
Sykula et al.

(10) Patent No.: US 12,038,506 B2
(45) Date of Patent: Jul. 16, 2024

(54) SENSOR APPARATUS WITH CLEANING

(71) Applicant: Ford Global Technologies, LLC, Dearborn, MI (US)

(72) Inventors: Andre Sykula, Sterling Heights, MI (US); Michael Robertson, Jr., Garden City, MI (US); James Pizzimenti, Carleton, MI (US); William Ethan-Alexander McClure, Clawson, MI (US); Inderpal Singh, Lasalle/Ontario (CA)

(73) Assignee: Ford Global Technologies, LLC, Dearborn, MI (US)

( * ) Notice: Subject to any disclaimer, the term of this patent is extended or adjusted under 35 U.S.C. 154(b) by 997 days.

(21) Appl. No.: 17/000,524

(22) Filed: Aug. 24, 2020

(65) Prior Publication Data
US 2022/0057509 A1   Feb. 24, 2022

(51) Int. Cl.
| | |
|---|---|
| *B08B 3/02* | (2006.01) |
| *B08B 13/00* | (2006.01) |
| *B60S 1/52* | (2006.01) |
| *B60W 60/00* | (2020.01) |
| *G01S 7/02* | (2006.01) |
| *G01S 7/481* | (2006.01) |
| *G01S 13/931* | (2020.01) |
| *G01S 17/10* | (2020.01) |
| *G01S 17/931* | (2020.01) |
| *G01S 7/497* | (2006.01) |

(52) U.S. Cl.
CPC ............... *G01S 17/10* (2013.01); *B08B 3/02* (2013.01); *B08B 13/00* (2013.01); *B60S 1/52* (2013.01); *B60W 60/001* (2020.02); *G01S 7/027* (2021.05); *G01S 7/4814* (2013.01); *G01S 13/931* (2013.01); *G01S 17/931* (2020.01); *B60W 2420/403* (2013.01); *B60W 2420/408* (2024.01); *G01S 2007/4977* (2013.01); *G01S 2013/9323* (2020.01); *G01S 2013/93273* (2020.01)

(58) Field of Classification Search
None
See application file for complete search history.

(56) References Cited

U.S. PATENT DOCUMENTS

| | | | |
|---|---|---|---|
| 9,992,388 B2 | 6/2018 | Romack et al. | |
| 10,259,431 B1* | 4/2019 | Ybarra | B60S 1/566 |
| 2013/0048036 A1* | 2/2013 | Jonas | B60S 1/56 134/167 R |
| 2014/0151460 A1 | 6/2014 | Noffsinger et al. | |
| 2017/0210304 A1 | 7/2017 | Davies et al. | |
| 2018/0354468 A1* | 12/2018 | Krishnan | B60S 1/56 |

FOREIGN PATENT DOCUMENTS

KR   19980037421 A   8/1998

* cited by examiner

*Primary Examiner* — Cristi J Tate-Sims
(74) *Attorney, Agent, or Firm* — Frank A. MacKenzie; Bejin Bieneman PLC

(57) ABSTRACT

A sensor apparatus includes a base, a nozzle positioned in the base and rotatable relative to the base, an extension arm elongated from a first portion to a second portion, and a fluid source fluidly connected to the nozzle. The first portion is fixed to the nozzle, and the second portion is spaced from the nozzle. Pressurizing the fluid source applies force to the second portion of the extension arm.

16 Claims, 6 Drawing Sheets

SENSOR APPARATUS WITH CLEANING

BACKGROUND

Autonomous vehicles typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. When sensor lenses, covers, and the like become dirty, smudged, etc., sensor operation can be impaired or precluded.

DETAILED DESCRIPTION

Figure 1:
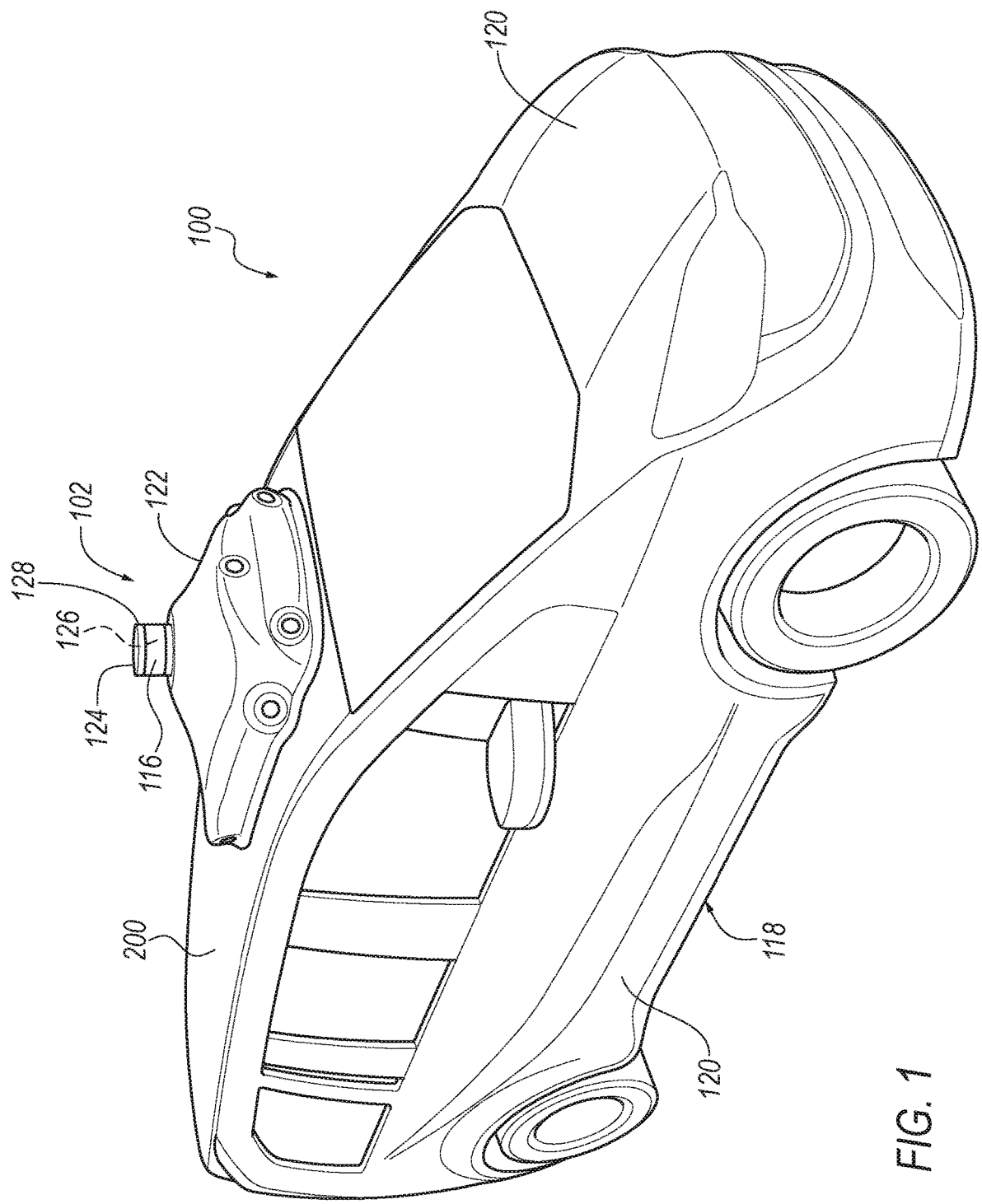
FIG. 1 is a perspective view of a vehicle with an example sensor apparatus.

A sensor apparatus includes a base a nozzle positioned in the base and rotatable relative to the base, an extension arm elongated from a first portion to a second portion, and a fluid source fluidly connected to the nozzle. The first portion is fixed to the nozzle, and the second portion is spaced from the nozzle. Pressurizing the fluid source applies force to the second portion of the extension arm.

The sensor apparatus may further include a tubular member fixed relative to the base, and the second portion of the arm may be movable along with a fluid level in the tubular member. The tubular member may be fluidly connected to the fluid source. The sensor apparatus may further include a plunger fixed to the second portion of the extension arm and movable through the tubular member, and the plunger may form a seal with the tubular member against fluid from the fluid source.

The sensor apparatus may further include a chamber enclosing an interior fluidly connected to the fluid source, and the base and the tubular member may be mounted to the chamber and open to the interior of the chamber. The fluid source may include a pump positioned to supply fluid to the chamber.

The sensor apparatus may further include a spring extending from a first end fixed relative to the base to a second end fixed relative to the second portion of the extension arm. The sensor apparatus may further include a sensor window, and the nozzle may be rotatable between a first position aimed at a first location on the sensor window and a second position aimed at a second location on the sensor window, and the spring may bias the nozzle toward the first position. Pressurizing the fluid source may bias the nozzle toward the second position.

The nozzle may have an outer surface that is spherical. The base may extend circumferentially around the nozzle. The base may have a cylindrical shape defining an axis, and the base may extend along the axis from an input end fluidly connected to the fluid source to an output end that is open. The nozzle may include an inlet orifice exposed to the input end of the base and an outlet orifice exposed to the output end of the base, and the inlet orifice may be fluidly connected to the fluid source. The nozzle may include a recess inward from the outer surface, and the recess may be sealed away from the fluid source.

The inlet orifice may have a greater cross-sectional area than the outlet orifice does.

The nozzle may form a seal with the base.

The sensor apparatus may further include a sensor window, and the nozzle may be rotatable between a first position aimed at a first location on the sensor window and a second position aimed at a second location on the sensor window.

With reference to the Figures, a sensor apparatus 102 for a vehicle 100 includes a base 104, a nozzle 106 positioned in the base 104 and rotatable relative to the base 104, an extension arm 108 elongated from a first portion 110 to a second portion 112, and a fluid source 114 fluidly connected to the nozzle 106, i.e., so that fluid can be carried from the fluid source 114 to the nozzle 106. The first portion 110 is fixed to the nozzle 106, and the second portion 112 is spaced from the nozzle 106. Pressurizing the fluid source 114 applies force to the second portion 112 of the extension arm 108.

The sensor apparatus 102 can clean a large area of a sensor window 116 because of the rotation of the nozzle 106 relative to the base 104, which sweeps the spray from the nozzle 106 along the sensor window 116. The sensor apparatus 102 can thus include a single nozzle 106 for a given area of the sensor window 116 rather than multiple nozzles 106. Pressurizing the fluid source 114 sprays fluid from the nozzle 106 and rotates the nozzle 106, obviating the need for electronic components or actuators for rotating the nozzle 106. Moreover, the components for rotating the nozzle 106 can be packaged alongside the nozzle 106, saving space elsewhere in the vehicle 100.

With reference to FIG. 1, the vehicle 100 may be any suitable type of automobile, e.g., a passenger or commercial automobile such as a sedan, a coupe, a truck, a sport utility vehicle, a crossover vehicle, a van, a minivan, a taxi, a bus, etc. The vehicle 100, for example, may be an autonomous vehicle. In other words, the vehicle 100 may be autonomously operated such that the vehicle 100 may be driven without constant attention from a driver, i.e., the vehicle 100 may be self-driving without human input, based in part on data from a sensor 124.

The vehicle 100 includes a body 118. The body 118 includes body panels 120 partially defining an exterior of the vehicle 100. The body panels 120 may present a class-A surface, e.g., a finished surface exposed to view by a customer and free of unaesthetic blemishes and defects. The body panels 120 include, e.g., a roof 200, etc.

A housing 122 for the sensor 124 and other sensors is attachable to the vehicle 100, e.g., to one of the body panels 120 of the vehicle 100, e.g., the roof 200. For example, the housing 122 may be shaped to be attachable to the roof 200, e.g., may have a shape matching a contour of the roof 200. The housing 122 may be attached to the roof 200, which can provide the sensor 124 with an unobstructed field of view of an area around the vehicle 100. The housing 122 may be formed of, e.g., plastic or metal.

The sensor 124 is supported by the housing 122. The sensor 124 can be disposed on top of the housing 122 at a highest point of the housing 122. The sensor 124 has a cylindrical shape and defines an axis A.

The sensor 124 may be designed to detect features of the outside world; for example, the sensor 124 may be a radar sensor, a scanning laser range finder, a light detection and ranging (LIDAR) device, or an image processing sensor such as a camera. In particular, the sensor 124 may be a LIDAR device, e.g., a scanning LIDAR device. A LIDAR device detects distances to objects by emitting laser pulses at a particular wavelength and measuring the time of flight for the pulse to travel to the object and back. The operation of the sensor 124 is performed by a sensing device 126 inside a sensor housing 128. The sensor 124 has a field of view encompassing a region from which the sensor 124 receives input.

Figure 2:
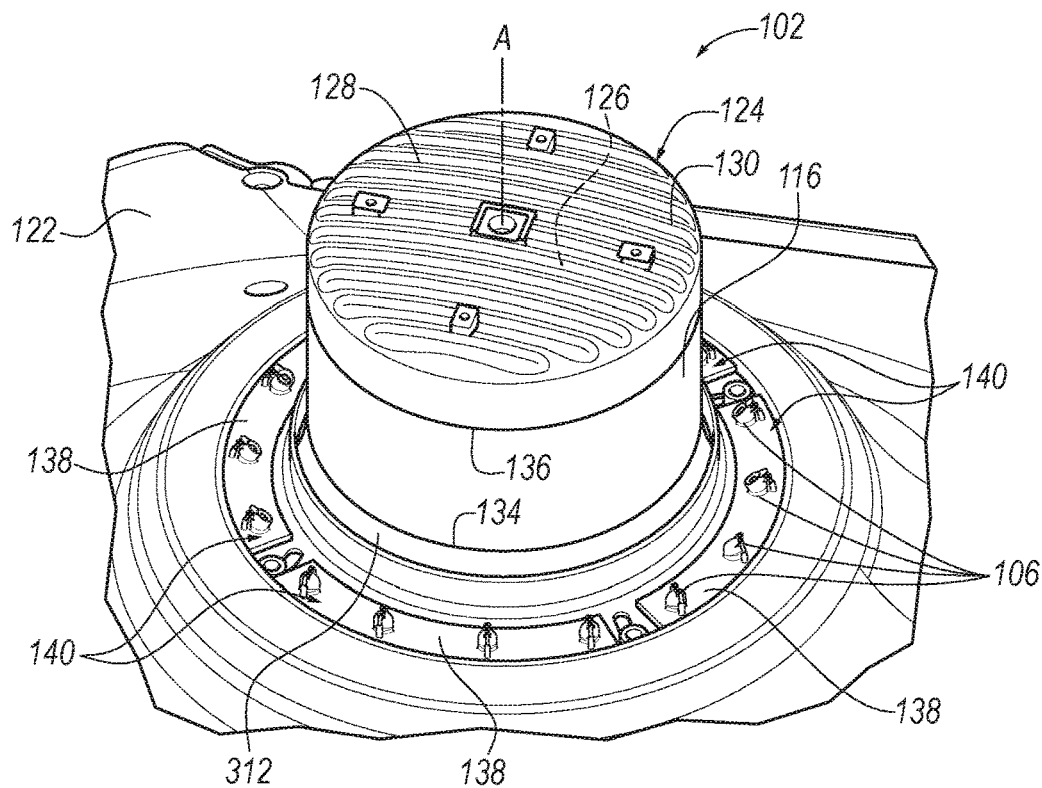
FIG. 2 is a perspective view of a portion of the sensor apparatus.

With reference to FIG. 2, the sensor 124 includes the sensor housing 128. The sensor housing 128 includes a sensor-housing cap 130, the sensor window 116, and a sensor-housing base 132. The sensor-housing cap 130 is disposed directly above the sensor window 116, and the sensor-housing base 132 is disposed directly below the sensor window 116. The sensor-housing cap 130 and the sensor-housing base 132 are vertically spaced apart by a height of the sensor window 116.

The sensor window 116 is oriented generally vertically, i.e., extends up and down. The sensor window 116 is cylindrical and defines the axis A, which is oriented vertically. The sensor window 116 extends around the axis A. The sensor window 116 can extend fully around the axis A, i.e., 360°, or partially around the axis A. The sensor window 116 extends along the axis A, i.e., vertically, from a bottom edge 134 to a top edge 136. The bottom edge 134 contacts the sensor-housing base 132, and the top edge 136 contacts the sensor-housing cap 130. At least some of the sensor window 116 is transparent with respect to whatever medium the sensing device 126 is capable of detecting. For example, if the sensor 124 is a LIDAR device, then the sensor window 116 is transparent with respect to visible light at the wavelength generated and received by the sensing device 126. The field of view of the sensor 124 extends through the sensor window 116.

A plurality of chambers 138 are fixed relative to the sensor window 116. For example, the chambers 138 can be mounted to the housing 122, e.g., bolted to the housing 122, to which the sensor housing 128 including the sensor window 116 is mounted. The chambers 138 can be directly attached to each other, or the chambers 138 can be attached to each other indirectly via the housing 122.

Each chamber 138 is elongated circumferentially around the axis A. The chambers 138 include at least three chambers 138; for example, as shown in the Figures, the chambers 138 include four chambers 138. Each chamber 138 can have substantially the same circumferential elongation around the axis A, e.g., 90°. The chambers 138 collectively form a ring 140 substantially centered around the axis A. The circumferential elongation of the chambers 138 can sum to 360°, e.g., four chambers 138 of 90° each.

Figure 3:
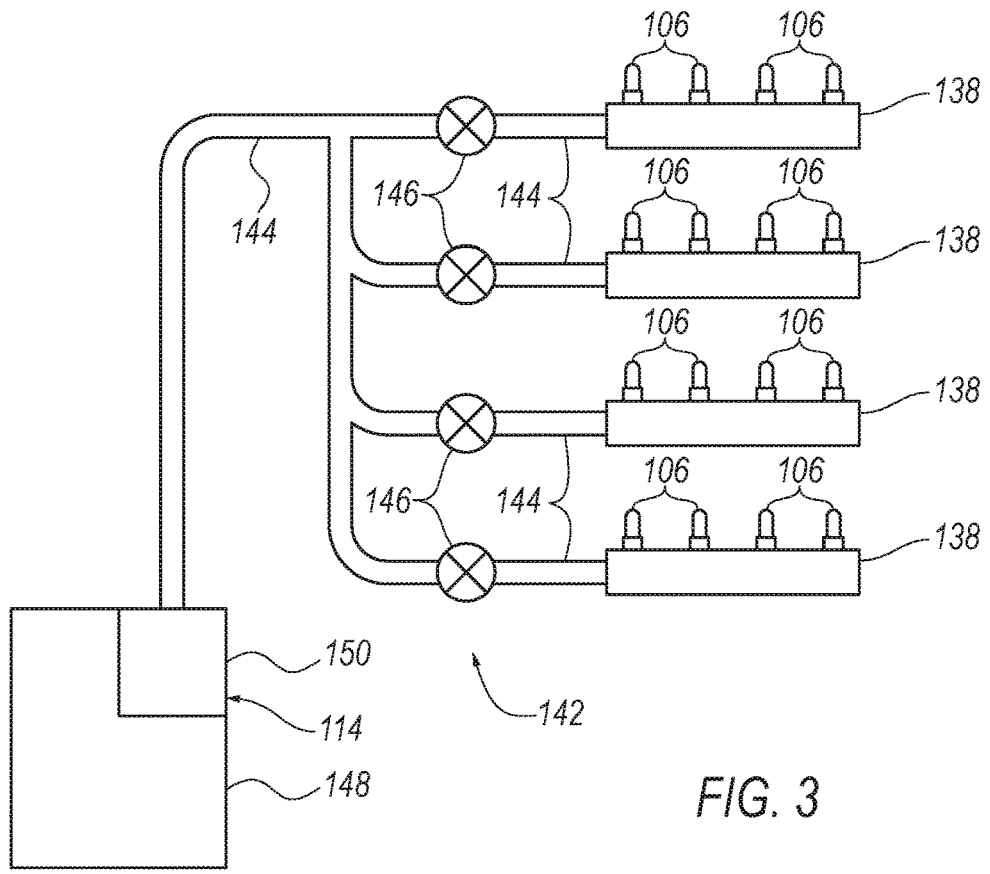
FIG. 3 is a diagram of a liquid cleaning system of the sensor apparatus.

With reference to FIG. 3, a liquid cleaning system 142 of the vehicle 100 includes the fluid source 114, hoses 144, valves 146, the chambers 138, and the nozzles 106. The fluid source 114 is fluidly connected (i.e., fluid can flow from one to the other) to each valve 146, to each chamber 138, and thus to the nozzles 106. The liquid cleaning system 142 distributes washer fluid from the fluid source 114 to the nozzles 106. "Washer fluid" refers to any liquid stored for cleaning. The washer fluid may include solvents, detergents, diluents such as water, etc.

The fluid source 114 can include a reservoir 148 and one or more pumps 150. The reservoir 148 may be a tank fillable with liquid, e.g., washer fluid for window cleaning. The reservoir 148 may be disposed inside the housing 122. Alternatively, the reservoir 148 may be disposed in a front of the vehicle 100, specifically, in an engine compartment forward of a passenger cabin. The reservoir 148 may store the washer fluid only for supplying the sensor apparatus 102 or also for other purposes, such as supply to a windshield of the vehicle 100.

The pump 150 may force the washer fluid through the hoses 144 to the nozzles 106 with sufficient pressure that the washer fluid sprays from the nozzles 106. The pump 150 is positioned to supply fluid to the chambers 138. The pump 150 is fluidly connected to the reservoir 148. The pump 150 may be attached to or disposed in the reservoir 148.

The hoses 144 can extend from the pump 150 to the valves 146, and from the valves 146 to the chambers 138. A separate hose 144 extends from each valve 146 to the respective chamber 138. The hoses 144 may be, e.g., flexible tubes.

The valves 146 are independently actuatable to open and close, to permit the washer fluid to flow through or to block the washer fluid; i.e., each valve 146 can be opened or closed without changing the status of the other valves 146. Each valve 146 is positioned to permit or block flow from the fluid source 114 to a respective one of the chambers 138. The valves 146 may be any suitable type of valve, e.g., ball valve, butterfly valve, choke valve, gate valve, globe valve, etc.

The chambers 138 distribute the washer fluid to the nozzles 106 mounted on the chambers 138. Each chamber 138 distributes the washer fluid to a subset of the nozzles 106, which are mounted on that chamber 138. Each chamber 138 is fluidly isolated from the other chambers 138. In other words, the chambers 138 are arranged such that fluid cannot flow from one to the other.

The nozzles 106 are positioned to receive washer fluid from the fluid source 114 via the respective chamber 138, as described in more detail below. The nozzles 106 are aimed at the sensor window 116. The nozzles 106 are movable between a first position and a second position, as described in more detail below. Each nozzle 106 is aimed at the sensor window 116 both in the first position and in the second position.

Figure 4:
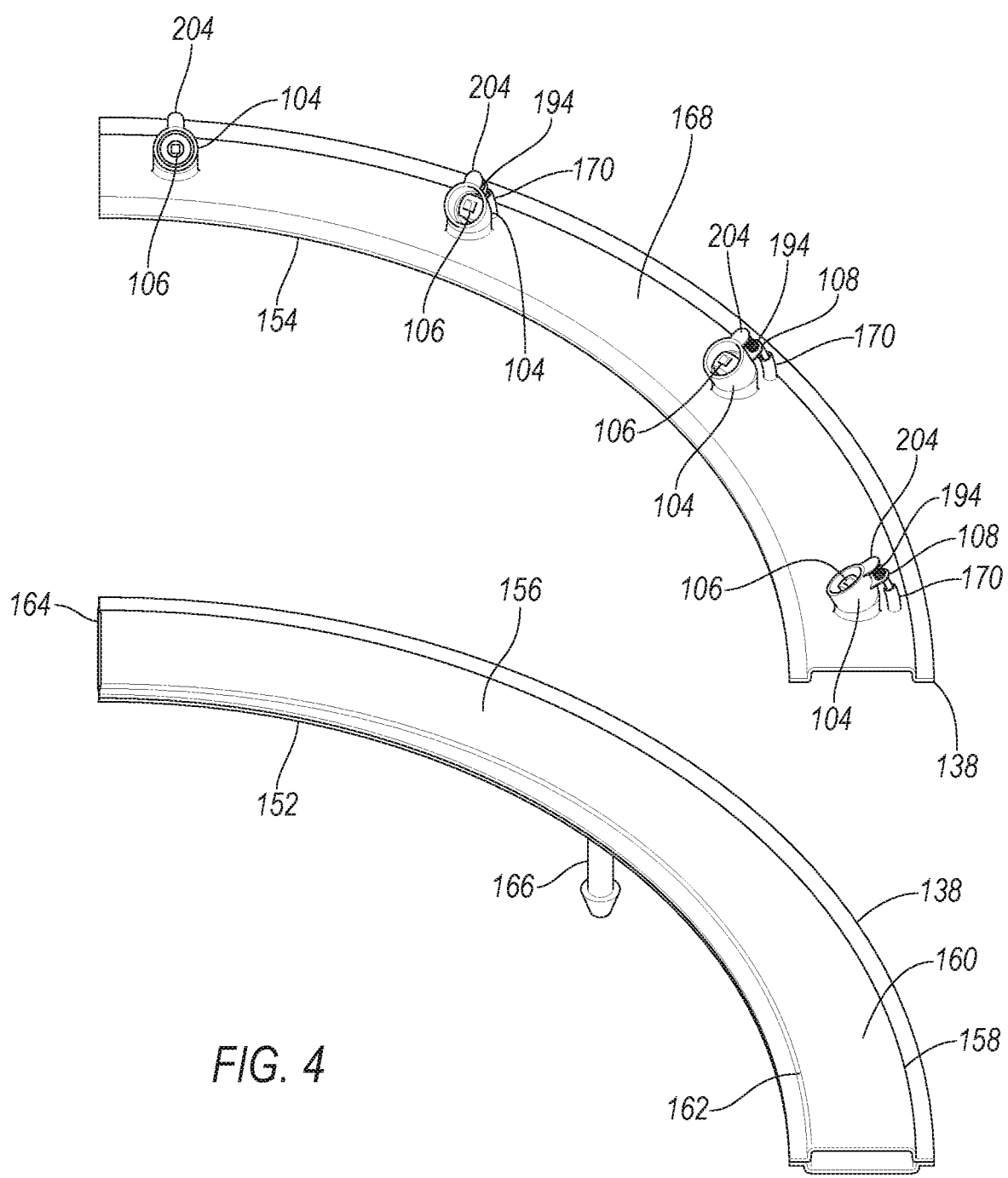
FIG. 4 is an exploded perspective view of a chamber of the sensor apparatus.

With reference to FIG. 4, each chamber 138 includes a lower piece 152 and an upper piece 154. Each lower piece 152 defines a channel 156 extending circumferentially around the axis A with the respective chamber 138. Specifically, each channel 156 has a substantially constant cross-section along an arc extending circumferentially around the axis A. The cross-section of each channel 156 includes a radially outer side wall 158, a floor 160, and a radially inner side wall 162. The floor 160 extends horizontally, the radially outer side wall 158 extends vertically from a radially outer edge of the floor 160, and the radially inner side wall 162 extends vertically from a radially inner edge of the floor 160. Each lower piece 152 includes two end walls 164. Each channel 156 extends circumferentially around the axis A from one end wall 164 of that lower piece 152 to the other end wall 164 of that lower piece 152.

Each lower piece 152 includes an inlet 166. The fluid source 114 is fluidly coupled to each chamber 138 via the respective inlet 166. The inlets 166 extend downward from the respective lower pieces 152, specifically from the respective floors 160. Each inlet 166 may be disposed approximately halfway along the circumferential elongation of the respective lower piece 152; e.g., if the lower piece 152 has a circumferential elongation of 90°, the inlet 166 is approximately 45° from either end of the lower piece 152.

Each upper piece 154 of the respective chamber 138 encloses the respective channel 156 of the lower piece 152 of that chamber 138. Each upper piece 154 extends circumferentially around the axis A with the channel 156 from one end wall 164 to the other end wall 164 of the respective lower piece 152, and each upper piece 154 extends radially outward from the radially inner side wall 162 to the radially outer side wall 158 of the respective lower piece 152. The upper pieces 154 each include a top panel 168, a subset of the bases 104, and a subset of tubular members 170. Each upper piece 154 can be a single piece, i.e., made of a single, uniform piece of material with no seams, joints, fasteners, or adhesives holding it together. The chambers 138 are sealed other than the bases 104, the tubular members 170, and the inlets 166. The chambers 138 are thus fluidly isolated from each other.

Figure 5:
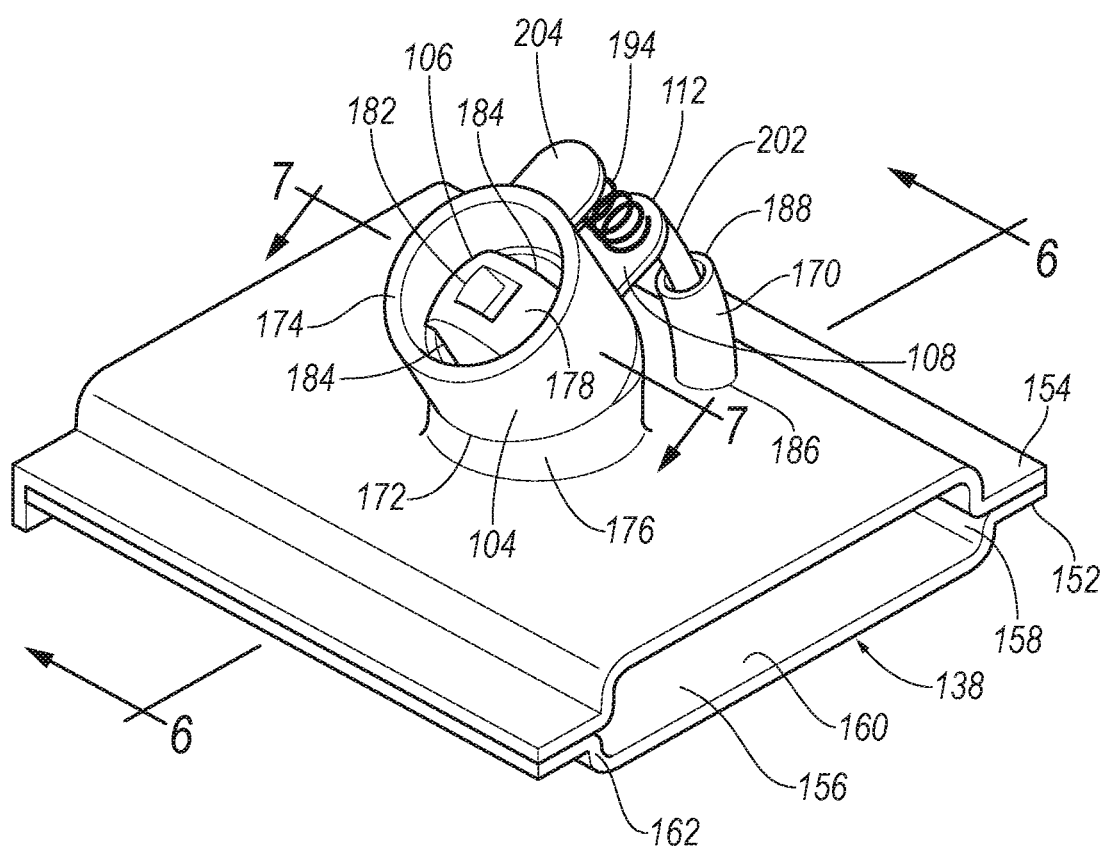
FIG. 5 is a perspective view of a portion of the sensor apparatus.
Figure 6:
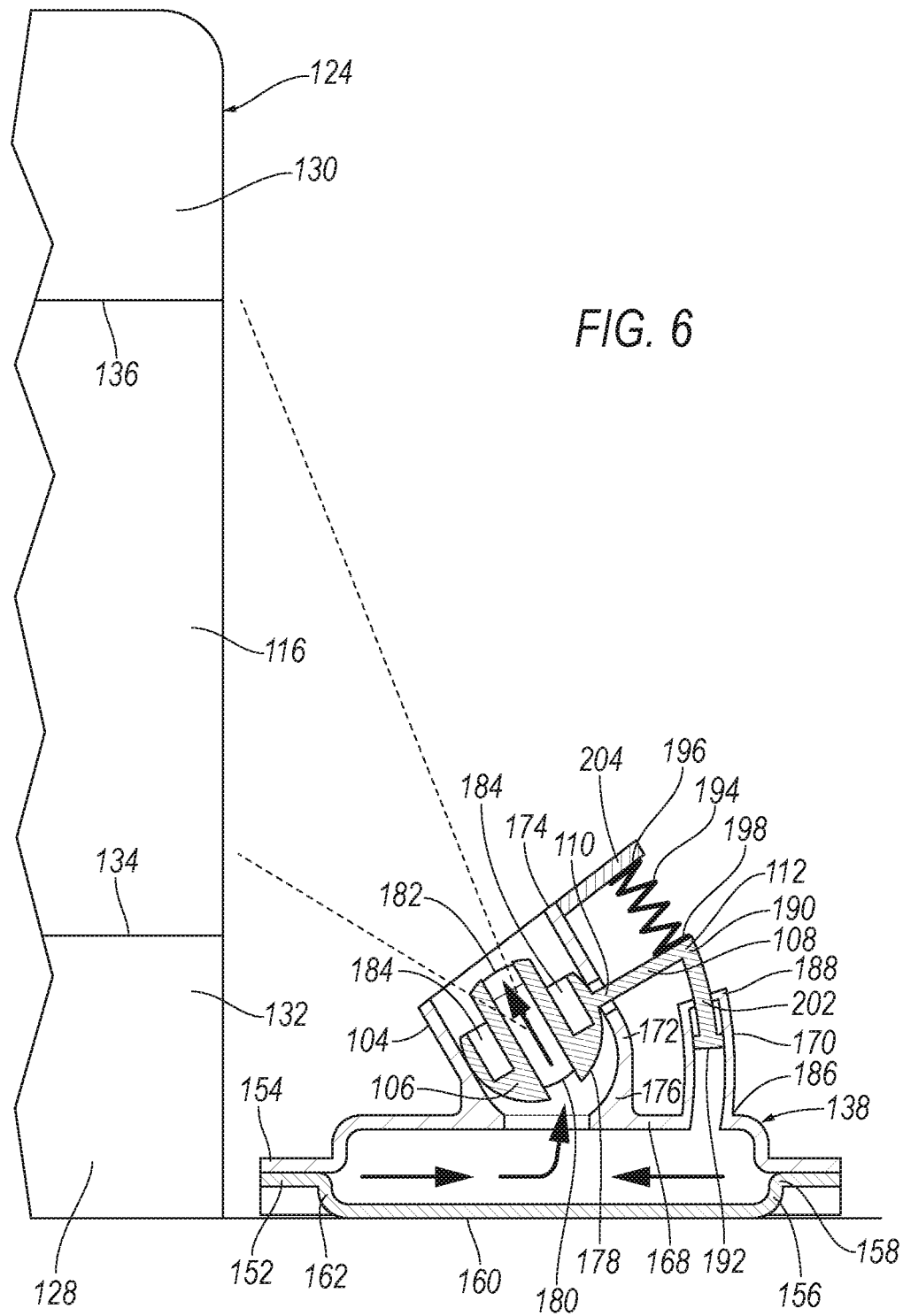
FIG. 6 is a side cross-sectional view of a portion of the sensor apparatus.

With reference to FIGS. 5 and 6, each base 104 has a cylindrical shape defining an axis B. Each base 104 extends along the respective axis B from an input end 172 to an output end 174. Each input end 172 is fluidly connected to the fluid source 114 by a hollow stem 176 connecting the input end 172 to the respective top panel 168 and thus to the respective chamber 138. Each output end 174 is open, e.g., to an ambient environment. Each output end 174 is unconnected to any other component except via the respective input end 172. Each base 104 is oriented such that the respective axis B intersects the axis A at an oblique angle.

Each nozzle 106 has an outer surface 178 that is spherical. Each nozzle 106 does not include any portions extending radially outside the outer surface 178. Each nozzle 106 can include an inlet orifice 180, an outlet orifice 182, and one or more recesses 184 extending radially inward from the outer surface 178.

Each nozzle 106 is positioned in the respective base 104. Each nozzle 106 forms a seal with the respective base 104; i.e., fluid can only flow from the input end 172 to the output end 174 of the base 104 through the nozzle 106, not around the nozzle 106. A diameter of the outer surface 178 of the nozzle 106 can be substantially equal to or slightly larger than an inner diameter of the base 104.

Figure 7:
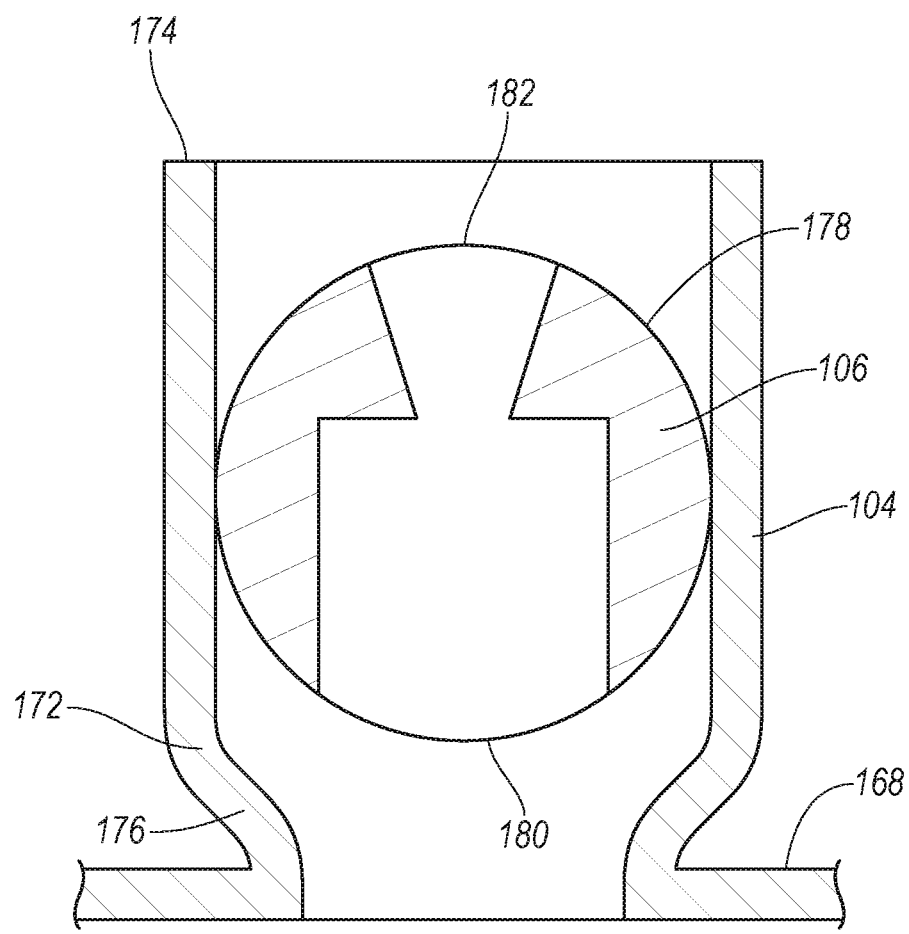
FIG. 7 is a top cross-sectional view of a portion of the sensor apparatus.

With reference to FIG. 7, each nozzle 106 includes the respective inlet orifice 180 and the respective outlet orifice 182. The inlet orifice 180 is exposed to the input end 172 of the respective base 104. The inlet orifice 180 is fluidly connected to the fluid source 114 via the respective input end 172. The outlet orifice 182 is exposed to the output end 174 of the respective base 104. Fluid from the fluid source 114 can flow from the inlet orifice 180 to the outlet orifice 182 and exit to the ambient environment out the output end 174 of the base 104. The inlet orifice 180 has a greater cross-sectional area at the outer surface 178 of the nozzle 106 than the cross-sectional area of the outlet orifice 182 at the outer surface 178 of the nozzle 106. The change in cross-sectional area from the inlet orifice 180 to the outlet orifice 182 increases the speed of the fluid as the fluid exits through the outlet orifice 182.

Returning to FIGS. 5 and 6, each nozzle 106 includes at least one, e.g., two, recess 184 inward from the outer surface 178. The recesses 184 are sealed away from the fluid source 114. For example, the recesses 184 are open to the output end 174 of the base 104 and sealed from the input end 172 of the base 104. The recesses 184 can be shaped to receive a specialized tool, which can be used to install the nozzle 106 in the base 104 and/or adjust a position of the nozzle 106 in the base 104.

Each nozzle 106 is rotatable relative to the respective base 104. Each nozzle 106 is rotatable between a first position aimed at a first location on the sensor window 116 and a second position aimed at a second location on the sensor window 116. The first location can be directly above the second location.

The sensor apparatus 102 includes one tubular member 170 for each base 104. The tubular members 170 extend upward from the respective top panels 168. Each tubular member 170 is fixed relative to the respective base 104 and is spaced from the respective base 104. For example, each tubular member 170 can be positioned radially outward from the respective base 104 relative to the axis A.

Each tubular member 170 is elongated from a connected end 186 to a free end 188. The connected end 186 is attached to the respective top panel 168, and the free end 188 is spaced from the respective top panel 168. Each tubular member 170 is open to the interior of the respective chamber 138 at the connected end 186, and fluid from the fluid source 114 can enter each tubular member 170 at the connected end 186.

Each tubular member 170 has a constant cross-section from the connected end 186 to the free end 188. Each tubular member 170 is elongated along an arc of circle from the connected end 186 to the free end 188, and a center of the circle is a center of the spherical shape of the outer surface 178 of the respective nozzle 106.

The sensor apparatus 102 includes a plunger 202 for each tubular member 170. Each plunger 202 is positioned in and movable through the respective tubular member 170. Each plunger 202 is elongated from an external end 190 to an internal end 192. Each plunger 202 is elongated along an arc of circle from the external end 190 to the internal end 192, and a center of the arc of circle is a center of the spherical shape of the outer surface 178 of the respective nozzle 106. Each plunger 202 is elongated along a path with a radius of curvature equal to a radius of curvature of a path of elongation of the respective tubular member 170.

The internal end 192 is positioned inside the respective tubular member 170, and the external end 190 is positioned outside the respective tubular member 170. The internal end 192 of the plunger 202 forms a seal with the respective tubular member 170 against fluid from the fluid source 114.

The sensor apparatus 102 includes an extension arm 108 for each nozzle 106. Each extension arm 108 is elongated from the first portion 110 to the second portion 112. The first portion 110 is fixed to the respective nozzle 106. The second portion 112 is spaced from the nozzle 106. The second portion 112 is fixed relative to the plunger 202, e.g., is fixed to the external end 190 of the plunger 202. The extension arms 108 are rigid. Each respective plunger 202, extension arm 108, and nozzle 106 move together as a unit, rotating relative to the center of the arcs of circle defined by the respective tubular member 170 and plunger 202. A force applied to the second portion 112 of one of the extension arms 108 acts as a torque on the respective nozzle 106, tending to rotate that nozzle 106. For example, the second portion 112 of the extension arm 108 is movable along with the fluid level in the respective tubular member 170 via the respective plunger 202. Pressurizing the fluid source 114 raises the fluid level in the tubular member 170 and exerts a force on the second portion 112 via the plunger 202, tending to rotate the nozzle 106 to the second position.

The sensor apparatus 102 includes a spring 194 for each nozzle 106. Each spring 194 extends from a first end 196 fixed relative to the respective base 104 to a second end 198 fixed relative to the second portion 112 of the respective extension arm 108. The spring 194 can be a linear spring, a torsion spring, or any other type of spring suited to the distance moved by the second portion 112 and the force exerted by the fluid source 114 via the plunger 202 on the second portion 112. The first end 196 of each spring 194 can be fixed to a spring mount 204 extending from and rigidly connected to the output end 174 of the respective base 104. The second end 198 of each spring 194 can be fixed to the second portion 112 of the respective extension arm 108. As installed, each spring 194 biases the respective nozzle 106 to the first position; i.e., each spring 194 is in a relaxed position (or in a position with a lowest force along a limited range of motion of the spring 194) when the nozzle 106 is in the first position. The spring 194 exerts a force tending to push or pull the second portion 112 of the respective extension arm 108, and thus exerts a torque tending to rotate the respective nozzle 106, proportional to a deviation of the spring 194 from the relaxed position.

In operation, when the fluid source 114 is not pressurized, each spring 194 exerts a torque on the respective nozzle 106 via a force on the second portion 112 of the respective extension arm 108 that rotates that nozzle 106 to the first position. When the fluid source 114 is pressurized, e.g., when the pump 150 is activated and one of the valves 146 is opened, fluid from the respective chamber 138 exits the nozzles 106 connected to that chamber 138 and sprays the first locations on the sensor window 116 corresponding to the first positions of the nozzles 106 of that chamber 138. At the same time, the fluid levels of the tubular members 170 connected to that chamber 138 rise and exert forces on the respective plungers 202 greater than the forces exerted by the respective springs 194. The forces on the plungers 202 exert torques on the nozzles 106 via the extension arms 108 that rotate the nozzles 106 from the first position to the second position. The sprays from the nozzles 106 move downward on the sensor window 116 from the first locations to the second locations. The nozzles 106 thereby clean the sensor window 116 along the full height of the sensor window 116. When the fluid source 114 ceases being pressurized, the springs 194 move the nozzles 106 back to the first positions.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. A sensor apparatus comprising:
a base having a cylindrical shape defining an axis;
a nozzle positioned in the base and rotatable relative to the base, the nozzle having an outer surface that is spherical and centered on the axis, the outer surface forming a seal with an inner diameter of the cylindrical shape of the base;
an extension arm elongated from a first portion to a second portion, wherein the first portion is fixed to the nozzle, and the second portion is spaced from the nozzle; and
a fluid source fluidly connected to the nozzle and configured to pressurize a fluid supplied to the nozzle;
wherein pressurizing the fluid source applies force to the second portion of the extension arm.

2. The sensor apparatus of claim 1, further comprising a tubular member fixed relative to the base, wherein the second portion of the extension arm is movable along with a fluid level in the tubular member.

3. The sensor apparatus of claim 2, wherein the tubular member is fluidly connected to the fluid source.

4. The sensor apparatus of claim 3, further comprising a plunger fixed to the second portion of the extension arm and movable through the tubular member, wherein the plunger forms a seal with the tubular member against fluid from the fluid source.

5. The sensor apparatus of claim 3, further comprising a chamber enclosing an interior fluidly connected to the fluid source, wherein the base and the tubular member are mounted to the chamber and open to the interior of the chamber.

6. The sensor apparatus of claim 5, wherein the fluid source includes a pump positioned to supply fluid to the chamber.

7. The sensor apparatus of claim 1, further comprising a spring extending from a first end fixed relative to the base to a second end fixed relative to the second portion of the extension arm.

8. The sensor apparatus of claim 7, further comprising a sensor window, wherein the nozzle is rotatable between a first position aimed at a first location on the sensor window and a second position aimed at a second location on the sensor window, and the spring biases the nozzle toward the first position.

9. The sensor apparatus of claim 8, wherein pressurizing the fluid source biases the nozzle toward the second position.

10. The sensor apparatus of claim 1, wherein the base extends circumferentially around the nozzle.

11. The sensor apparatus of claim 10, wherein the base extends along the axis from an input end fluidly connected to the fluid source to an output end that is open.

12. The sensor apparatus of claim 11, wherein the nozzle includes an inlet orifice exposed to the input end of the base and an outlet orifice exposed to the output end of the base, and the inlet orifice is fluidly connected to the fluid source.

13. The sensor apparatus of claim 12, wherein the nozzle includes a recess inward from the outer surface, and the recess is sealed away from the fluid source.

14. The sensor apparatus of claim 12, wherein the inlet orifice has a greater cross-sectional area than the outlet orifice does.

15. The sensor apparatus of claim 1, further comprising a sensor window, wherein the nozzle is rotatable between a first position aimed at a first location on the sensor window and a second position aimed at a second location on the sensor window.

16. The sensor apparatus of claim 2, wherein the tubular member is elongated along an arc of circle, and a center of the arc of circle is a center of the spherical shape of the outer surface of the nozzle.

* * * * *